US005235876A

United States Patent [19]
Minowa et al.

[11] Patent Number: 5,235,876
[45] Date of Patent: Aug. 17, 1993

[54] CHANGE GEAR CONTROL DEVICE USING ACCELERATION AND GEAR RATIO AS PARAMETERS FOR AUTOMATIC TRANSMISSION IN MOTOR VEHICLE AND THE METHOD THEREFOR

[75] Inventors: Toshimichi Minowa, Toukai; Hiroshi Kimura, Hitachi; Yoshiyuki Yoshida, Yokohama; Yoshishige Ohyama; Yutaka Nishimura, both of Katsuta, all of Japan

[73] Assignee: Hitachi, Ltd., Tokyo, Japan

[21] Appl. No.: 840,816

[22] Filed: Feb. 25, 1992

[30] Foreign Application Priority Data

Feb. 25, 1991 [JP] Japan ................... 3-050148

[51] Int. Cl.$^5$ ................... F02D 43/00; B60K 41/04
[52] U.S. Cl. ................... 74/866; 364/424.1
[58] Field of Search ................... 74/866; 364/424.1

[56] References Cited

U.S. PATENT DOCUMENTS

| | | | |
|---|---|---|---|
| 4,679,145 | 7/1987 | Beeck et al. | 74/866 X |
| 4,893,526 | 1/1990 | Tokoro | 74/866 |
| 4,930,374 | 6/1990 | Simonyi et al. | 74/866 |
| 4,945,483 | 7/1990 | Tokoro | 74/866 X |
| 5,025,684 | 6/1991 | Stehle et al. | 74/866 X |
| 5,035,160 | 7/1991 | Morita | 364/424.1 X |
| 5,067,374 | 11/1991 | Sakai et al. | 74/866 |
| 5,113,721 | 5/1992 | Polly | 74/866 |
| 5,129,288 | 7/1992 | Sasaki et al. | 364/424.1 X |
| 5,150,635 | 9/1992 | Minowa et al. | 74/866 |

Primary Examiner—Leslie A. Braun
Assistant Examiner—Khoi Q. Ta
Attorney, Agent, or Firm—Antonelli, Terry, Stout & Kraus

[57] ABSTRACT

A change gear control device for an automatic transmission in a motor vehicle comprising, an acceleration sensor which detects an acceleration on the motor vehicle into its traveling direction; a vehicle traveling speed detector; a controller for processing change gear ratio for the automatic transmission which reads a detected acceleration from the acceleration sensor, a detected vehicle traveling speed and further the instant transmission gear ratio from the automatic transmission, calculates an engine torque based upon the acceleration and the instant transmission gear ratio, determines a new transmission gear ratio based upon the calculated engine torque and the vehicle traveling speed, and outputs a signal representing the new transmission gear ratio to the automatic transmission; a further acceleration sensor which detects an acceleration acting on the motor vehicle in its lateral direction; and an arrangement for inhibiting the signal representing the new transmission gear ratio from the change gear ratio processing controller to the automatic transmission when a lateral acceleration acting on the motor vehicle detected by the further acceleration sensor exceeds a predetermined reference value.

8 Claims, 7 Drawing Sheets

CHANGE GEAR CONTROL DEVICE USING ACCELERATION AND GEAR RATIO AS PARAMETERS FOR AUTOMATIC TRANSMISSION IN MOTOR VEHICLE AND THE METHOD THEREFOR

BACKGROUND OF THE INVENTION

The present invention relates to a control device for a motor vehicle provided with a transmission mechanism, and in particular, relates to a change gear control device suitable for controlling an automatic transmission in a motor vehicle provided with a torque converter.

Conventional change gear control devices for automatic transmissions in motor vehicles are, for example, disclosed in JP-A-51-44763(1976) and JP-A-62-261745(1987) wherein a vehicle speed and a throttle valve opening degree are detected in a form of electrical signals and a transmission gear ratio appropriate to the instant vehicle speed and the throttle valve opening degree is selected among a predetermined change gear pattern by making use of the vehicle speed and the throttle valve opening degree as variables and further wherein a plurality of change gear patterns such as economic type driving pattern and sporty type driving pattern are prepared and are switched via change gear pattern selection operation by the driver.

With the above conventional change gear control devices, an intention of a driver was not sufficiently reflected to the change gear control device and the transmission gear control was determined by the selected instant transmission gear pattern allowing little modification so that a proper transmission gear ratio correctly reflecting the instant driving condition could not be obtained, therefore the driver had to frequently switch the change gear patterns to meet the instant driving condition which reduced operation facility of the motor vehicle.

SUMMARY OF THE INVENTION

An object of the present invention is to provide a change gear control device for an automatic transmission in a motor vehicle which requires no additional driving operation as in the conventional ones, correctly reflects the intention of the driver and improves the operation facility of the motor vehicle.

For achieving the above object, the change gear control device for an automatic transmission in a motor vehicle according to the present invention is provided with a change gear ratio processing means which determines a transmission gear ratio for the transmission mechanism based upon detected value of the engine torque and a detected value of the traveling speed of the motor vehicle or based upon a detected value of the engine torque and a detected value of the engine rotation number of the motor vehicle.

The change gear ratio processing means determines the transmission gear ratio for the transmission mechanism based upon the detected engine torque rather than the throttle valve opening degree corresponding to an acceleration pedal depression. The parameter of the engine torque much more closely meets the intention of the driver dependent upon respective driving conditions of the motor vehicle than that of the throttle valve opening degree. Namely, even at a same throttle valve opening degree, engine torque shows different rise characteristics due to differences such as vehicle weight and road surface resistance. For this reason, for example, when the weight of the vehicle is heavy, a shift-up timing according to the present invention is considerably delayed under an identical change gear pattern in comparison with that of the conventional change gear control devices which use the throttle valve opening degree for determining the transmission gear ratio, accordingly a change gear ratio control for the automatic transmission which highly meets the actual driving conditions of the motor vehicle has been achieved.

According to the present invention, a desirable change gear control for an automatic transmission in a motor vehicle which meets the intention of the driver is obtained without necessitating switching of the change gear patterns in such a manner that the performance of the motor vehicle is fully utilized depending upon driving conditions while permitting an improved operation facility for the driver of the motor vehicle.

DETAIL EXPLANATION OF THE EMBODIMENTS

Hereinbelow, the change gear control device for an automatic transmission in a motor vehicle according to the present invention is explained in detail with reference to the embodiments as shown.

Figure 1:
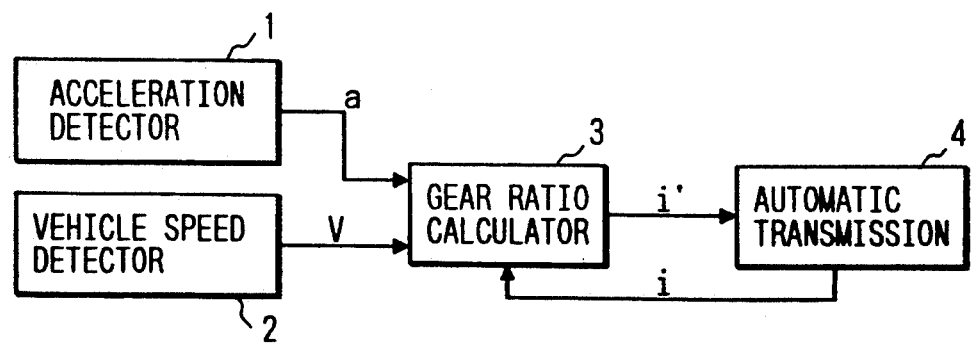
FIG. 1 is a block diagram showing one embodiment of the change gear control device for an automatic transmission in a motor vehicle according to the present invention.

FIG. 1 shows one embodiment of the present invention which comprises an acceleration detector 1, a vehicle traveling speed detector 2, a change gear ratio processor 3 and an automatic transmission 4.

The acceleration detector 1 consists of such as an acceleration sensor and functions to detect a vehicle accelaration a in its traveling direction.

The vehicle traveling speed detector 2 consists of such as a sensor which detects a rotating speed of the vehicle propeller shaft and functions to detect a vehicle traveling speed V.

The change gear ratio processor 3 consists of a microcomputer, determines the engine torque Te based upon the detected acceleration a and calculates a transmission gear ratio with reference to a change gear characteristic map contained therein by making use of the determined engine torque Te and the vehicle traveling speed V as its retrieval inputs.

The automatic transmission 4 consists of a torque converter and a planetary gear mechanism and functions to switch the transmission gear ratio in the driving system disposed between the engine and the driven wheels by making use of a control signal fed from the change gear ratio processor 3.

Now, the operation of the present embodiment is explained with reference to the flow chart shown in FIG. 2. The processing shown in the flow chart is adapted to be performed by the microcomputer in the change gear ratio processor 3 at a predetermined time period via such as a timer interruption and when the process starts, at first in step 20 the vehicle traveling speed V from the vehicle traveling speed detector 2 is read, thereafter, in step 21 the acceleration a from the acceleration detector 1 is read. Further in step 22 the value of transmission gear ratio i now in use is read from the automatic transmission 4.

Subsequently, in step 23 based upon the acceleration a and the value of instant transmission gear ratio i, the engine torque Te at this moment is calculated. Namely, calculation of Te=f(a, i) is performed. The derivations are as followed:

$$T\alpha = T_o - T\theta - T_{RO} \quad (1)$$

$$T\alpha = I\dot{v} \quad (2)$$

$$T\theta = \sin\theta \times W \times R \quad (3)$$

$$T_o = I\dot{v} + \sin\theta \times W \times R + T_{RO} \quad (4)$$

$$Te = T_o / (\lambda \times i \times iend) \quad (5)$$

$$\sin\theta \propto (a - \dot{v})/g \quad (6)$$

$$Te \propto \{I\dot{v} + (a - \dot{v}) \times W \times R/g + T_{RO}\}/(\lambda + i + iend) \quad (7)$$

where
- $T_o$ = torque of transmission input shaft
- $T_\alpha$ = torque required for acceleration
- $Te$ = torque output of engine
- $T\theta$ = torque due to slope of road
- $T_{RO}$ = torque due to running resistance
- $I$ = inertia mass
- $\dot{v}$ = angular acceleration of wheel
- $W$ = weight of vehicle
- $R$ = radius of wheel
- $\lambda$ = torque ratio of the torque converter
- $i$ = instant gear ratio
- $iend$ = final reduction ratio
- $a$ = acceleration of vehicle
- $g$ = gravitational acceleration The engine torque Te may be obtained by a predetermined torque map having retrieval inputs of the acceleration a and the value of instant transmission gear ratio i.

Figure 3:
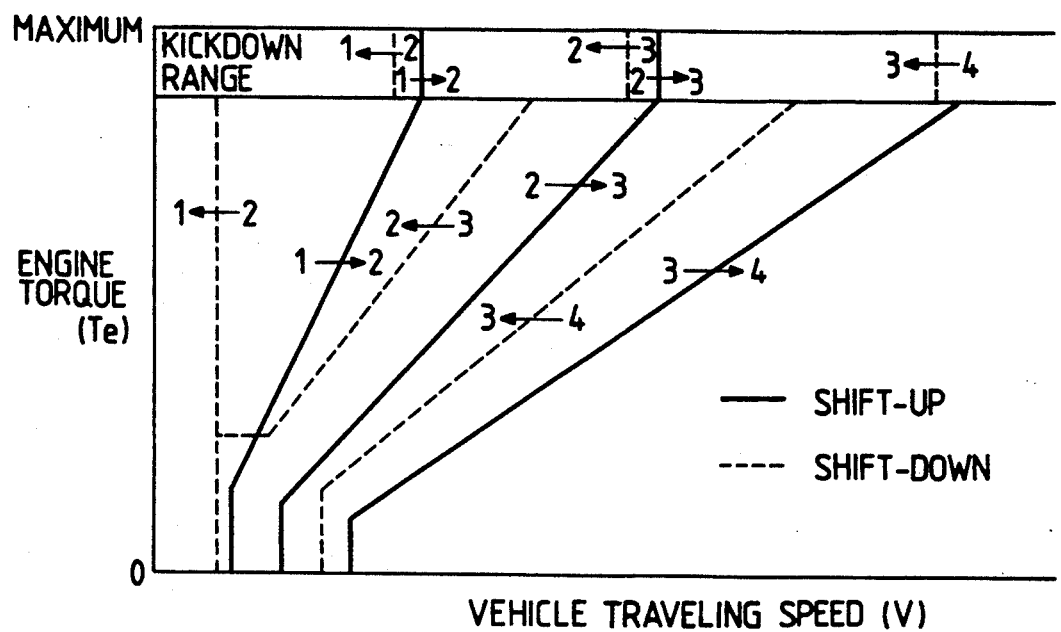
FIG. 3 is a change gear characteristic map used in the embodiment in FIG. 1.

In step 24, whether or not switching of the transmission gear ratio at this moment is necessary is determined by making use of the change gear characteristic map shown in FIG. 3 with reference to the determined engine torque Te, the read vehicle traveling speed V and the read value of the instant the transmission gear ratio i and when it is determined that the switching of transmission gear ratio is necessary, in step 25 based upon the determination in the preceeding step a new transmission gear ratio i' is output to the automatic transmission 4 to complete the processing, in other words, when the read value of the instant transmission gear ratio i is at the first gear speed but the point on the change gear characteristic map determined by the determined engine torque Te and the read vehicle traveling speed V locates in a region of the second gear speed, the change gear ratio processor 3 determines to switch the transmission gear ratio from the first gear speed to the second gear speed and output a new transmission gear ratio i corresponding to the second gear speed to the automatic transmission 4.

In the change gear control for the conventional automatic transmission, a predetermined transmission gear ratio was selected in a selected predetermined change gear pattern by making use of the variables of the vehicle traveling speed and the throttle valve opening degree as explained above. Therefore with the conventional change gear control, it was difficult to correctly switch the transmission gear ratio in response to the variation of driving conditions, in particular, the variation of load on the vehicle during travel. For example when, traveling on a flat road or a gentle downhill road it is considered preferable to hasten the shift-up timing in comparison with a travel on an uphill road in order to improve fuel consumption without sacrificing the driving performance. However in the conventional change gear control which was determined by making use of the throttle valve opening degree and the vehicle traveling speed, such change gear control could not be realized unless the change gear patterns were switched. Such change gear patterns are similar to the change gear characteristic map shown in FIG. 3 except that the throttle valve opening degree was used as the ordinate variable.

However, in the present embodiment, the change gear control is carried out dependent upon the engine torque, the switching timing of change gear ratio varies even at an identical throttle valve opening degree, and even under an identical change gear pattern the shift-up timing is delayed when the load on the vehicle during travel is heavy and is hastened when the load is light, so that a correct switching of transmission gear ratio depending upon driving conditions of the vehicle is realized to thereby achieve an improvement in driving performance of the vehicle as well as in fuel consumption.

In the present embodiment, the engine torque is determined by calculation by making use of the vehicle acceleration in its traveling direction which is detected by the acceleration detector, such that a special torque sensor is eliminated which minimizes the manufacturing cost increase of the present embodiment. However, in place of the acceleration detector 1 a torque sensor may be used, in such instance the engine torque is directly detected therewith and is inputted to the change gear ratio processor 3.

Figure 4:
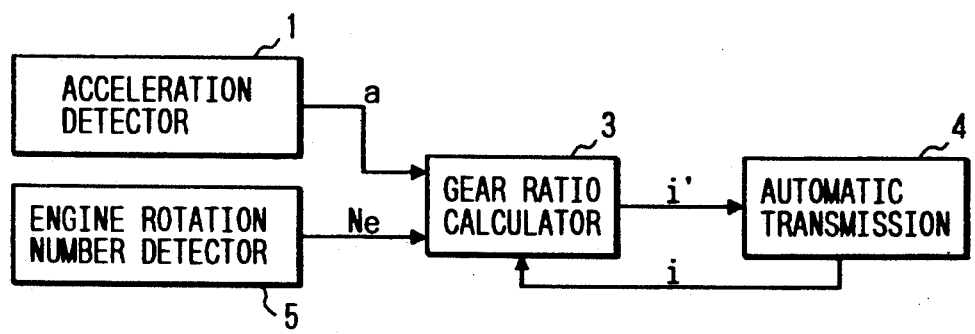
FIG. 4 is a block diagram showing another embodiment of the change gear control device for an automatic transmission in a motor vehicle according to the present invention.

FIG. 4 shows a block diagram of another embodiment according to the present invention wherein the same or equivalent elements as in the first embodiment are designated by the same reference numerals. In FIG. 4, an engine rotation number detector 5 functions to detect an engine rotation number Ne as the name indicates which is constituted to determine the engine rotation number Ne by counting pulses from a pulse generator such as a crank angle sensor mounted on the engine crank shaft.

A difference of the present embodiment shown in FIG. 4 from the first embodiment shown in FIG. 1 is that the engine rotation number detector 5 is provided in place of the vehicle traveling speed detector 2 in FIG. 1 and wherein by making use of the engine rotation number Ne itself other than the vehicle traveling speed V and the engine toque Te a transmission gear ratio is calculated and determined.

Now, the operation of the present embodiment shown in FIG. 4 is explained with reference to the flow chart shown in FIG. 5.

Figure 5:
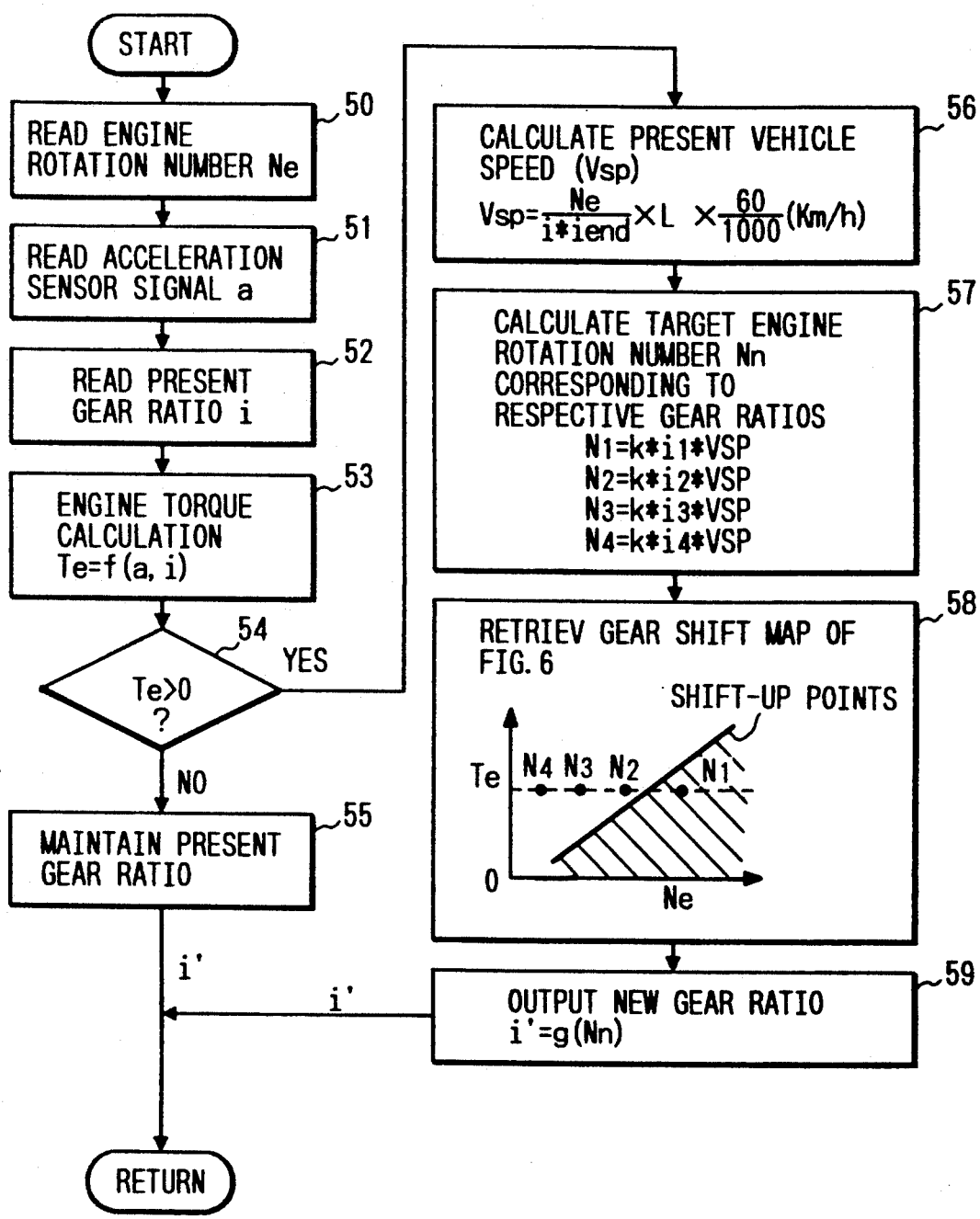
FIG. 5 is a flow chart for explaining the operation of the embodiment shown in FIG. 4.

The processing shown in the flow chart in FIG. 5 is adapted to be performed by a microcomputer in a change gear ratio processor 3 at a predetermined time period via such as a timer interruption. When the process starts, at first stage in steps 50, 51 and 52 an engine rotation number Ne, acceleration a and the instant transmission gear ratio i of the automatic transmission 4 are sequentially read in, and further, in step 53, the engine torque Te is calculated based upon these data. The processing in steps 51 through 53 is the same as that in steps 21 through 23 in FIG. 2 in connection with the first embodiment.

In step 54, it is judged whether or not the engine torque Te now determined indicates a finite value and when the result of the judgement is NO, namely when the engine torque Te is determined zero which implies that no switching of the transmission gear ratio is needed, the process proceeds to step 55 wherein the instant transmission gear ratio i is output as a new transmission gear ratio i' to maintain the instant transmission gear ratio and to complete the processing.

On the other hand, when the result of the judgement in step 54 is YES, namely when the engine torque Te is determined a finite value which implies that switching of the transmission gear ratio may be needed, and the process proceeds to steps 56 through 59 to determine a new the transmission gear ratio i'. In the present processing the engine torque Te is calculated based upon the acceleration a detected by the acceleration detector 1 so that even is the calculated engine torque Te is zero, the actual engine torque is not necessarily implied to be zero.

In step 56, the present vehicle traveling speed Vsp(Km/h) is calculated based upon the present engine rotation number Ne, the present gear ratio i, the final reduction gear ratio of the differential gear i end, and the outer diameter L(m) of the driving wheel in accordance with the following equation.

$$Vsp = (Ne)/(i \times i \text{ end}) \times L \times (60)/(1000) \qquad (1)$$

In step 57, target engine rotation numbers $N_1$, $N_2$, $N_3$ and $N_4$ for the respective gear ratios $i_1$, $i_2$, $i_3$ and $i_4$ corresponding to the first and second third, fourth gear speeds are calculated by making use of the calculated Vsp in accordance with the following equations.

$$N_1 = k \times i_1 \times Vsp$$

$$N_2 = k \times i_2 \times Vsp$$

$$N_3 = k \times i_3 \times Vsp$$

$$N_4 = k \times i_4 \times Vsp \qquad (2)$$

wherein k is a constant.

Figure 6:
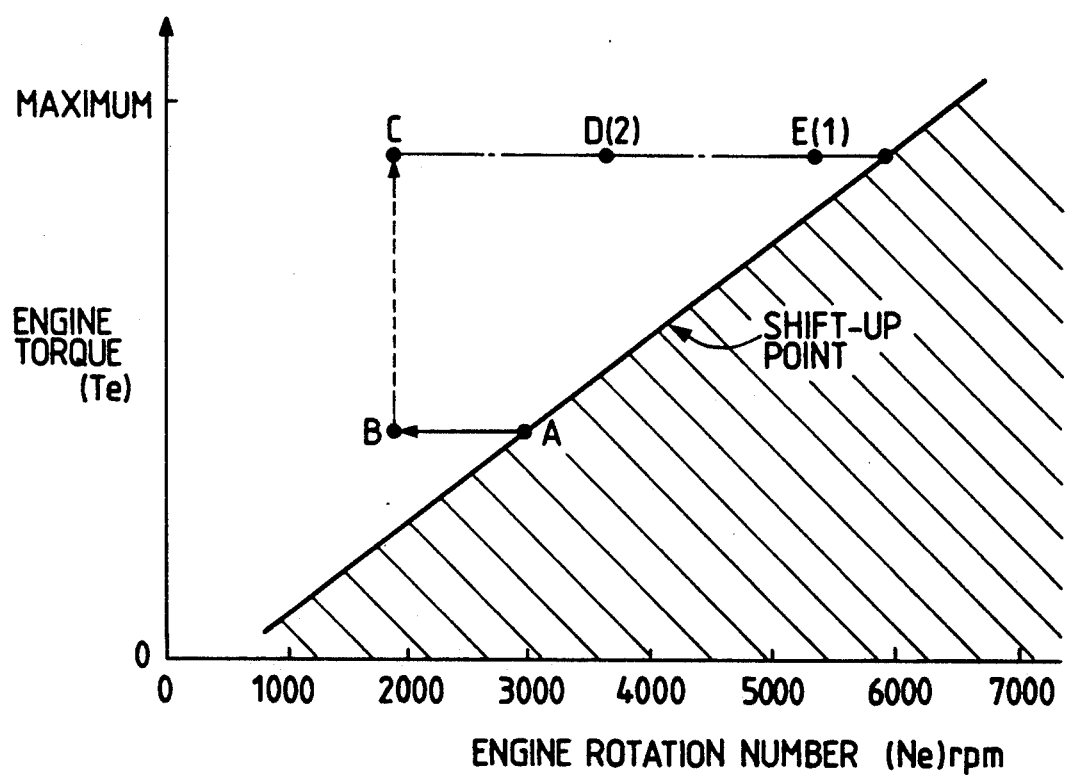
FIG. 6 is another change gear characteristic map used in the embodiment shown in FIG. 4.

Subsequently, in step 58, the change gear characteristic map shown in FIG. 6 is retrieved, in that since the engine torque Te has been determined in step 53, the target engine rotation numbers $N_1$, $N_2$, $N_3$ and $N_4$ corresponding to the respective transmission gear ratios can be plotted on the change gear characteristic map as shown in the block of step 58 wherein the solid line indicates shift-up points and the target engine rotation numbers determined by the respective gear ratios above the solid line indicates those to be selectable as a target engine rotation number, and the nearest target engine rotation number to the solid line, in the present instance $N_2$ is selected and outputted to step 59. In step 59, based upon the inputted target engine rotation number $N_2$ a new transmission gear ratio i' is determined and outputted to the automatic transmission to complete the present processing.

Now, the switching operation of the transmission gear ratio by making use of the simple change gear characteristic map shown in FIG. 6 is explained in detail.

When the engine torque Te is on the horizontal line passing through point A, the switching of the transmission gear ratio is caused at the engine rotation number Ne of about 3000 (rpm). After the switching of gear ratio the engine rotation number Ne once reduces to the vicinity of 2000 (rpm) and then the engine rotation number Ne again rises up to the point A near 3000 (rpm) because the engine torque Te is maintained unchanged and when the engine rotation number reaches the shift-up point indicated by the solid line the automatic transmission is shifted-up again.

On the other hand, when the instant transmission gear ratio i of the automatic transmission 4 is at the third gear speed and at point B on the change gear characteristic map and the engine torque Te suddenly changes up to point C which implies that the driver wants to generate a large driving torque through shift-down. In other words, the increase of the engine torque Te from point B to point C is initiated by the acceleration pedal depression by the driver. As a result the acceleration under the instant transmission gear ratio i is increased to thereby cause the engine torque increase. In this instance, via the processing in steps 58 and 59 a new transmission gear ratio i' is provided to shift-down the transmission gear ratio. Namely, since the instant gear ratio i is at the third gear speed position indicated by point C, when the second gear speed corresponding to gear ratio $i_2$ indicated by point D(2) is selected the engine rotation number Ne rises up to slightly below 4000 (rpm) and likely when the first gear speed corresponding to gear ratio $i_1$ indicated by point E(1) is selected the engine rotation number Ne rises up to above 5000 (rpm) to thereby obtain a large acceleration.

In the present embodiment too, the gear change is carried out dependent upon the engine torque, the switching timing of change in gear ratio varies even at an identical throttle valve opening degree, and even under an identical change gear pattern the shift-up timing is delayed when the load on the vehicle during travel is heavy and is hastened when the load is light so that a correct switching of the gear ratio depending upon driving conditions of the vehicle is realized to thereby achieve an improvement in driving performance of the vehicle as well as in fuel consumption.

Figure 7:
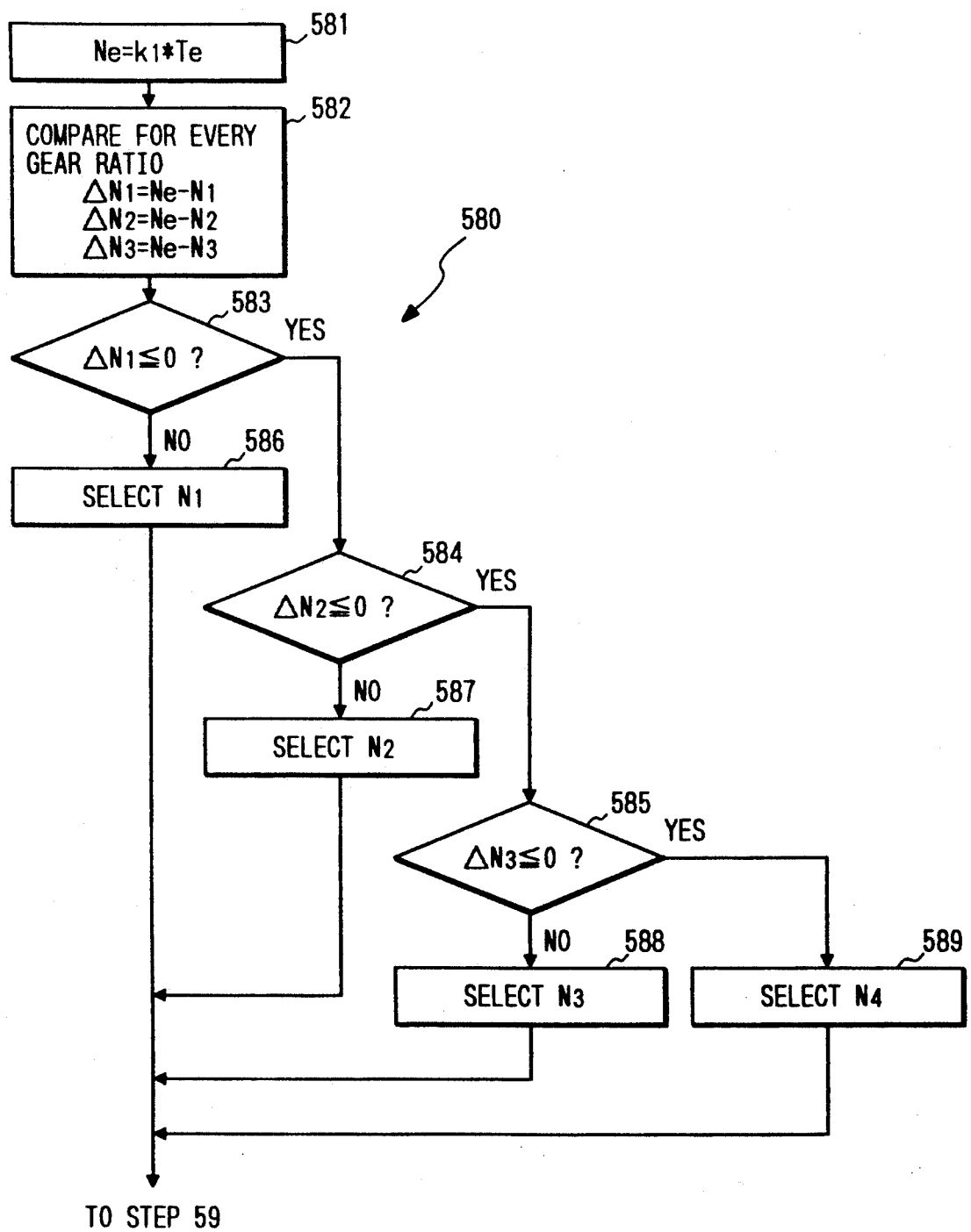
FIG. 7 is a flow chart showing a modification of step 58 in FIG. 5.

FIG. 7 shows a flow chart which is a modification of the processing in step 58 shown in FIG. 5. In step 58, the change gear characteristic map shown in FIG. 6 is used to determine a target engine rotation number Nn. However in the modified step 580 shown in FIG. 7 instead of using the change gear characteristic map in step 581 the engine rotation number Ne at the shift-up point is calculated according to the following equation.

$$Ne = k_1 \times Te \qquad (3)$$

wherein $k_1$ is a constant.

In step 582, the calculated engine rotation number Ne at the shift-up point is compared with the respective target engine rotation numbers $N_1$, $N_2$ and $N_3$ calculated previously to obtain the respective following differences;

$$\Delta N_1 = Ne - N_1$$

$$\Delta N_2 = Ne - N_2$$

$$\Delta N_3 = Ne - N_3 \qquad (4)$$

Via steps 583 through 589, one of the target engine rotation numbers $N_1$, $N_2$, $N_3$ and $N_4$ is selected to determine a new transmission gear ratio i' in step 59.

Figure 8:
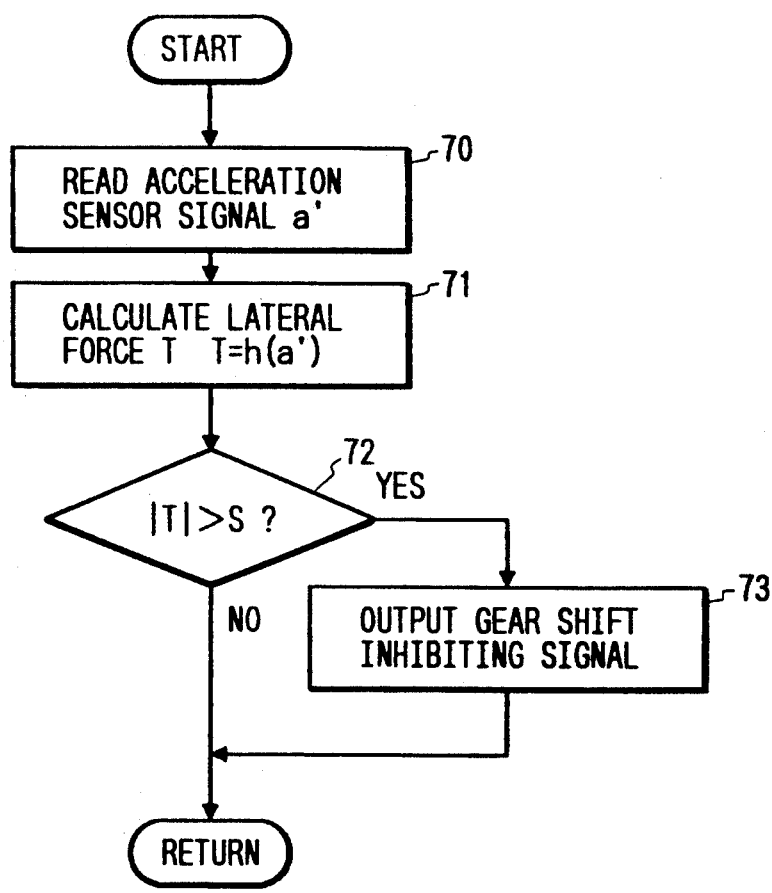
FIG. 8 is a flow chart for explaining a further modification which may be added to the embodiments shown in FIG. 1 and FIG. 4.

A further embodiment which may be added to the first and second embodiments is explained with reference to the flow chart in FIG. 8.

Figure 2:
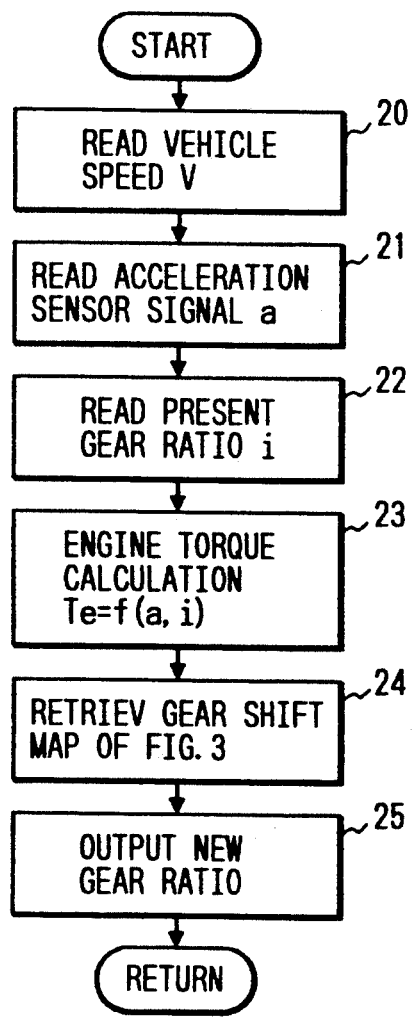
FIG. 2 is a flow chart for explaining the operation of the embodiment shown in FIG. 1.
Figure 1A:
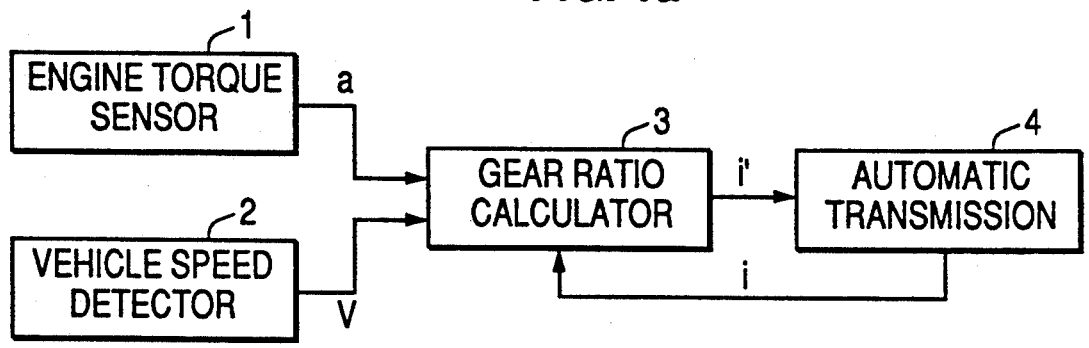
FIG. 1a is an alternative embodiment using a torque sensor.
Figure 2A:
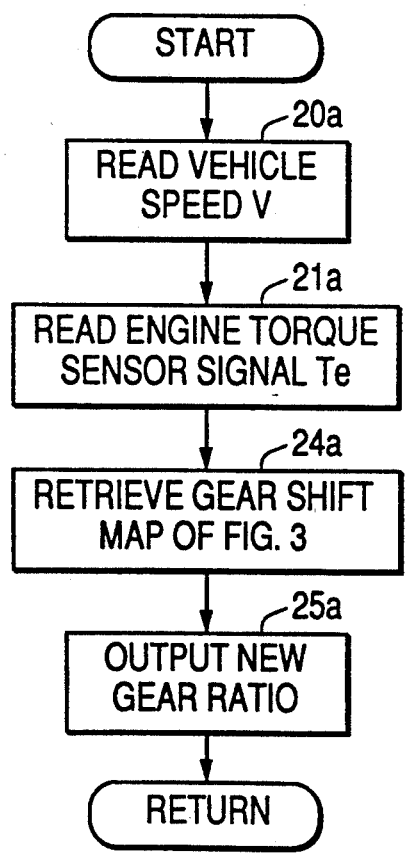
FIG. 2a is a flowchart of the operation of the FIG. 1a embodiment.

In the first and second embodiments, as will be understood from the flow charts shown in FIG. 2 and FIG. 5 explaining the processing in the change gear ratio processor 3, once the change gear ratio processor 3 judges that the transmission gear ratio is to be switched, the judgement is immediately transmitted to the automatic transmission 4 and the gear ratio is switched.

However, when a large lateral force is acting on the vehicle such as when the vehicle is traveling along a sharply curved road at a comparatively high speed, if the switching of the gear ratio is performed the driving stability of the motor vehicle may be endangered.

For preventing such drawback, in the present embodiment an acceleration sensor which is capable of detecting an acceleration appearing in right and left directions of the vehicle is added, and in step 70 the output a' from the additional acceleration sensor is detected. In step 71 a lateral force T is calculated according to a predetermined function T=h(a'), and further in step 72, it is judged whether or not the absolute value of the lateral force 1T1 exceeds a predetermined reference value s, and when the judgement result is YES, in that, 1T1>s, the process goes to step 73 through which a signal inhibiting switching of the gear ratio is outputted to prevent the switching of the gear ratio in the automatic transmission 4.

Accordingly, with the present embodiment, the switching of the gear ratio is inhibited when a lateral force beyond the predetermined reference value is acting on the vehicle which is experienced such as when the vehicle is traveling along a sharply curved road.

The above embodiment is easily realized without much increase in the manufacturing cost thereof, because in the first and second embodiments an acceleration sensor which detects an acceleration in the vehicle traveling direction is already incorporated. It is only necessary to modify the acceleration sensor to be able to detect an acceleration in the vehicle lateral direction in addition to that in the vehicle traveling direction.

We claim:

1. A change gear control device for an automatic transmission in a motor vehicle comprising, sensing means for detecting an engine torque of the motor vehicle;

means for detecting a vehicle speed represented by at least one of a vehicle traveling speed and an engine rotational speed; and means for processing change gear ratio for the automatic transmission, said change gear ratio processing means reads the detected engine torque from said engine torque sensing means and the detected vehicle speed from said vehicle speed detecting means, determines a new transmission gear ratio based upon the engine torque and the vehicle speed, and outputs a signal representing the new transmission gear ratio to the automatic transmission.

2. A change gear control device for an automatic transmission in a motor vehicle comprising:

an acceleration sensor which detects an acceleration of the motor vehicle in its traveling direction;

means for detecting a vehicle speed represented by at least one of a vehicle traveling speed and an engine rotational speed; and means for determining an instant transmission gear ratio;

means for processing change gear ratio for the automatic transmission, said change gear ratio processing means determines the engine torque based upon the detected acceleration from said acceleration sensor and the instant transmission gear ratio from the automatic transmission, further determines a new transmission gear ratio based upon the determined engine torque and the detected vehicle speed from said vehicle speed detecting means, and outputs a signal representing the new transmission gear ratio to the automatic transmission.

3. A change gear control device for an automatic transmission in a motor vehicle according to claim 2, further comprising a further acceleration sensor which detects an acceleration acting on the motor vehicle in its lateral direction and means for inhibiting the signal representing the new transmission gear ratio from said change gear ratio processing means to the automatic transmission when a lateral acceleration acting on the motor vehicle detected by said further acceleration sensor exceeds a predetermined reference value.

4. A change gear control method for an automatic transmission in a motor vehicle comprising the steps of:

detecting a traveling speed of the motor vehicle;

detecting an acceleration of the motor vehicle in its traveling direction;

detecting the instant transmission gear ratio of the automatic transmission;

calculating an engine torque based upon the detected acceleration and the instant transmission gear ratio;

retrieving a change gear characteristic map having map retrieval inputs of engine torque and vehicle traveling speed and divided by shift-up and shift-down curves between respective gear speed positions to obtain a new transmission gear ratio based upon the detected traveling speed and the calculated engine torque; and outputting a signal representing the obtained new transmission gear ratio to the automatic transmission.

5. A change gear method for an automatic transmission in a motor vehicle according to claim 4 further comprising the steps of, detecting an acceleration acting on the motor vehicle in its lateral direction; and inhibiting the signal representing the obtained new transmission gear ratio to the automatic transmission when the detected lateral acceleration exceeds a predetermined reference value.

6. A change gear control method for an automatic transmission in a motor vehicle comprising the steps of:

detecting an engine rotational speeds of the motor vehicle;

detecting an acceleration of the motor vehicle in its traveling direction;

detecting the instant transmission gear ratio of the automatic transmission;

calculating an engine torque based upon the detected acceleration and the instant transmission gear ratio;

determining whether or not the calculated engine torque is a finite value;

calculating target engine rotational speeds corresponding to respective transmission gear ratios based upon the detected engine rotation number;

obtaining an engine rotation speed at a shift-up point which is absolutely determined by the calculated engine torque;

comparing the engine rotation speed at the shift-up point determined by the calculated engine torque with the respective calculated target engine rotational speeds;

selecting the nearest calculated target engine rotational speeds to the engine rotation speed at the shift-up point but below the engine rotation speed at the shift-up point;

determining a new transmission gear ratio based upon the selected nearest calculated target engine rotation number; and outputting a signal representing the determined new transmission gear ratio to the automatic transmission.

7. A change gear method for an automatic transmission in a motor vehicle according to claim 6 further comprising the steps of, detecting an acceleration acting on the motor vehicle in its lateral direction; and inhibiting the signal representing the determined new transmission gear ratio to the automatic transmission when the detected lateral acceleration exceeds a predetermined reference value.

8. A change gear method for an automatic transmission in a motor vehicle according to claim 6 wherein said selecting step is performed by retrieving a change gear characteristic map having map retrieval inputs of engine torque and engine rotation number and having a single line determining shift-up points represented by engine rotation numbers for the respective engine torque.

* * * * *